(12) United States Patent
Takeda

(10) Patent No.: US 11,340,176 B2
(45) Date of Patent: May 24, 2022

(54) X-RAY INSPECTION APPARATUS AND X-RAY INSPECTION METHOD

(71) Applicant: HITACHI HIGH-TECH SCIENCE CORPORATION, Tokyo (JP)

(72) Inventor: Akihiro Takeda, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 98 days.

(21) Appl. No.: 16/999,970

(22) Filed: Aug. 21, 2020

(65) Prior Publication Data

US 2021/0148837 A1 May 20, 2021

(30) Foreign Application Priority Data

Nov. 20, 2019 (JP) .............................. JP2019-209245

(51) Int. Cl.
| G01N 23/04 | (2018.01) |
| G01N 23/10 | (2018.01) |
| G01N 23/20 | (2018.01) |
| G01N 23/18 | (2018.01) |
| G01N 23/083 | (2018.01) |

(52) U.S. Cl.
CPC ........... *G01N 23/04* (2013.01); *G01N 23/083* (2013.01); *G01N 23/10* (2013.01); *G01N 23/18* (2013.01); *G01N 23/20* (2013.01)

(58) Field of Classification Search
CPC ........ G01N 23/18; G01N 23/04; G01N 23/10; G01N 23/083; G01N 23/20
See application file for complete search history.

(56) References Cited

U.S. PATENT DOCUMENTS

| 5,561,696 A * | 10/1996 | Adams ................. G01R 31/311 378/58 |
| 8,483,355 B2 * | 7/2013 | Ichizawa .............. G01N 23/083 378/54 |
| 10,054,555 B2 * | 8/2018 | Matoba .................. G01N 23/04 |
| 10,422,757 B2 * | 9/2019 | Sugimoto .............. G01N 23/04 |
| 10,823,686 B2 * | 11/2020 | Urano .................... G01N 23/10 |

(Continued)

FOREIGN PATENT DOCUMENTS

| JP | 2001004560 A | 1/2001 |
| JP | 2014134457 A | 7/2014 |

*Primary Examiner* — David P Porta
*Assistant Examiner* — Djura Malevic
(74) *Attorney, Agent, or Firm* — Holland & Hart LLP

(57) ABSTRACT

The X-ray inspection apparatus includes an X-ray source, a sample moving mechanism, an X-ray detector equipped with a line sensor with pixels detecting X-ray radiation passing through a sample, an image storage unit for storing X-ray radiation intensities, an intensity correction unit for correcting the X-ray radiation intensities stored in the image storage unit, and a defect detector for detecting a defect in the sample. The intensity correction unit sets an intensity of X-rays detected from the inspection initiation region after starting inspection of the sample or an intensity of X-rays preliminarily detected from the sample before starting the inspection as a reference radiation intensity, and corrects an intensity of X-rays detected from the subsequent inspection region based on a correction coefficient obtained from comparison between the intensity of X-rays detected from the subsequent inspection region and the reference radiation intensity.

10 Claims, 10 Drawing Sheets

(56) References Cited

U.S. PATENT DOCUMENTS

| | | | |
|---|---|---|---|
| 2009/0225944 A1* | 9/2009 | Lee | G01N 23/2076 378/71 |
| 2011/0069813 A1* | 3/2011 | Ichizawa | G01B 15/025 378/54 |
| 2016/0041110 A1* | 2/2016 | Matoba | G01T 7/08 378/54 |
| 2017/0031054 A1* | 2/2017 | Matoba | G01N 23/04 |
| 2017/0299528 A1* | 10/2017 | Ogata | G01N 23/223 |
| 2018/0202947 A1* | 7/2018 | Urano | G01N 23/10 |

\* cited by examiner

X-RAY INSPECTION APPARATUS AND X-RAY INSPECTION METHOD

CROSS REFERENCE TO RELATED APPLICATION

The present application claims priority to Japan Patent Application No. 2019-209245, filed Nov. 20, 2019, the entire contents of which is incorporated herein for all purposes by this reference.

BACKGROUND OF THE INVENTION

Field of the Invention

The present invention relates to an X-ray inspection apparatus and an X-ray inspection method capable of detecting a foreign object in a sample.

Description of the Related Art

For detection of a foreign object such as a minute metal particle existing in a long sheet-like sample (which is an object to be inspected), X-ray transmission inspection is typically used. In the X-ray transmission inspection, a sample is conveyed by a belt conveyer or a roll-to-roll mechanism to an inspection region between an X-ray source and an X-ray detector, X-ray radiation is applied to the sample to obtain an X-ray transmission image of the sample, and the X-ray transmission image is examined to determine the presence or absence of a foreign object in the sample.

In the X-ray inspection apparatus used in such an X-ray transmission inspection, inspection is continuously performed. Therefore, an X-ray inspection apparatus is required to maintain temporal stability in terms of the inspection capability thereof. However, it is not unusual that the intensity of X-ray radiation applied by an X-ray source or the sensitivity of an X-ray detector changes over time. Moreover, as being repeatedly exposed to X-ray radiation, the detection sensitivity of each of the elements in the X-ray detector is deteriorated, and a variation occurs in the deterioration of the detection sensitivity among the elements of the X-ray detector. It is also known that the intensity of X-ray radiation applied by the X-ray source varies with temperature rise. Therefore, there is a problem in that the outputs of the elements of the X-ray detector change over time although the outputs of the elements of the X-ray detector are uniform immediately after calibration. Thus, the overall output values of the elements of the X-ray detector are lowered or a variation occurs among the outputs of the respective elements of the X-ray detector, leading to a decrease in the detection capability of the X-ray inspection apparatus. To address this problem, the inspection is regularly stopped for a correction operation.

Line sensors or time delay integration (TDI) sensors included in the X-ray detector exhibit unstable detection accuracy which is influenced by fluctuations in environmental factors, for example, temperature fluctuations, luminance fluctuations of phosphor, or the like. In order to maintain the detection accuracy, it is necessary to periodically correct the intensity of X-rays detected by the pixels.

For example, Patent Document 1 discloses a technology for performing a correction operation without interrupting an inspection operation. In the technology, a means for determining whether X-rays are shielded by a sample is used, and a correction operation is performed during a period in which no sample is present.

In addition, Patent Document 2 discloses a technology for performing a correction operation without interrupting an inspection operation by using a signal indicating a boundary between packages in the case where individually packaged samples are inspected.

DOCUMENTS OF RELATED ART (Patent Document 1) Japan Patent Application Publication No. 2001-4560
(Patent Document 2) Japan Patent Application Publication No. 2014-134457

SUMMARY OF THE INVENTION

The related art described above has the problems described below.

That is, in the case where a sheet-like sample is inspected while being moved by a roll-to-roll mechanism or the like and a radiation intensity correction needs to be performed regularly during the inspection, the inspection can be stably performed only within a time duration corresponding to an interval between the radiation intensity corrections. Therefore, it is difficult to continuously perform X-ray inspection on a long sheet-like sample for detecting impurities in the sample. In addition, the radiation intensity correction needs to be performed in the absence of a sample. However, in the case of a long sheet-like sample, since the sample is always present between an X-ray source and an X-ray detector, it is difficult to perform intensity correction while performing inspection.

Patent Document 1 and Patent Document 2 in the related art disclose a method of performing intensity correction during a period in which no sample is present and a method of performing intensity correction using a signal indicating a boundary region (for which inspection is not necessary), respectively. However, when the period in which no sample is present or the boundary region is not sufficiently long, there is a probability that the correction cannot be properly performed. In particular, in the case where the sample is a long sheet-like sample, since the sample is continuously supplied, the technologies disclosed in Patent Documents 1 and 2 cannot be used.

The present invention has been made in view of the problem occurring in the related art. That is, an objective of the present invention is to provide an X-ray inspection apparatus and an X-ray inspection method that are capable of continuously inspecting a long sheet-like sample that is supplied in a roll-to-roll manner while performing intensity correction.

The present invention employs the following configurations to solve the above problem. That is, the X-ray inspection apparatus of the present invention includes: an X-ray source configured to irradiate a sample with X-rays; a sample moving mechanism configured to move the sample in a certain direction during irradiation with X-rays from the X-ray source; an X-ray detector installed to face the X-ray source with the sample disposed therebetween, the X-ray detector comprising a line sensor which is provided with a plurality of pixels that are arranged along a direction orthogonal to the certain direction and is configured to detect the X-rays which passed through the sample at the pixels; an image storage unit configured to store intensity of X-rays detected by each of the plurality of pixels; an intensity correction unit configured to correct the intensity of X-rays stored in the image storage unit; and a defect detector configured to detect whether there is a defect or not in the sample based on the intensity of X-rays, wherein the intensity correction unit, using the intensity of X-rays detected in an initial inspection initiation region of the sample when detection of X-rays was initiated or the intensity of X-rays detected from the sample prior to initiation of detection of the X-rays as reference radiation intensity, based on a correction coefficient obtained from comparison of the reference radiation intensity with the intensity of X-rays detected after the inspection initiation region, corrects the intensity of X-rays of the pixels detected in regions after the inspection initiation region.

In the X-ray inspection apparatus, the intensity correction unit may use the intensity of X-rays detected from the inspection initiation region of the sample after starting the inspection of the sample or the intensity of X-rays preliminarily detected from the sample before starting the inspection of the sample as the reference radiation intensity, obtain the correction coefficient by comparing the intensity of X-rays detected from an inspection region subsequent to the inspection initiation region of the sample and the reference radiation intensity, and correct the intensity of X-rays detected from the inspection region subsequent to the inspection initiation region based on the obtained correction coefficient. Therefore, it is possible to continuously inspect a long sheet-like sample while performing intensity correction. That is, since the intensity of X-rays of the earliest inspection region on which the temperature change of the X-ray detector has no influence or the intensity of X-rays that is preliminarily detected from the sample is set as the reference radiation intensity, and each of the intensity of X-rays which are subsequently detected is corrected based on the reference radiation intensity, it is not necessary to use a period during which no sample is present or find a boundary between sample packages for intensity correction and it is possible to continuously perform inspection on a long sample in real time.

An X-ray inspection apparatus as a second invention features that in the first invention, based on the correction coefficient obtained from comparison between the intensity of X-rays detected in a defect detection region which is a region of the sample where the defect is detected and the intensity of X-rays detected in a region immediately before the defect detection region, when the defect detector detects the defect, the intensity correction unit corrects the intensity of X-rays detected in the defect detection region.

That is, in the case where a defect is detected from a certain inspection region, since this X-ray inspection apparatus corrects the intensity of X-rays detected from the defect detection region based on the correction coefficient obtained by comparing the intensity of X-rays detected from the defect detection region and the intensity of X-rays detected from a defect-free inspection region immediately prior to the defect detection region, it is possible to perform the intensity correction with a proper correction coefficient while avoiding the defect. When the correction coefficient is calculated based on the intensity detected from the defect, an excessively large change occurs in the intensity of X-rays. Therefore, the correction coefficient calculated based on the intensity detected from the defect is not proper. Therefore, the correction coefficient is calculated using the intensity of X-rays detected from the defect-free inspection region that immediately proceeds to the defect detection region, resulting in an appropriate intensity correction for the defect detection region.

An X-ray inspection apparatus as a third invention features that in the first or second invention, the defect detector determines whether there is a defect based on a change in the correction coefficient.

That is, in this X-ray inspection apparatus, since the defect detector determines the presence or absence of the defect based on a change in the correction coefficient, it is possible to easily determine the presence or absence of the defect because the correction coefficient abruptly significantly changes when a defect is present.

An X-ray inspection apparatus as a fourth invention features that in any one invention of the first through third inventions, the X-ray detector comprises a line sensor calculation unit that controls accumulation and transmission of charges in the plurality of pixels according to the certain direction, the line sensor calculation unit divides the plurality of pixels into a plurality of blocks and performs the transmission for each block, the intensity correction unit performs, based on an average of the intensity of X-rays calculated for each block, correction of each of the plurality of pixels in the corresponding block is performed.

That is, in this X-ray inspection apparatus, since the intensity correction unit performs the intensity correction for each of the pixels in each block based on the averaged intensity of X-rays of a corresponding one of the multiple blocks, it is possible to reduce arithmetic operation compared to a case of performing intensity correction pixel by pixel.

An X-ray inspection apparatus as a fifth invention features that in one of the first to fourth inventions, the X-ray detector is provided with a TDI sensor having the line sensors in a plurality of columns along the certain direction with the plurality of pixels arranged in matrix, and detecting the X-rays which passed through the sample at the pixels.

An X-ray inspection method as a sixth invention includes: a step of X-ray irradiation, irradiating a sample with X-rays from an X-ray source; a step of sample movement, continuously moving the sample in a certain direction during irradiation with X-rays from the X-ray source; a step of X-ray detection, with an X-ray detector installed to face the X-ray source with the sample disposed therebetween, the X-ray detector comprising a line sensor which is provided with a plurality of pixels that are arranged along a direction orthogonal to the certain direction, detecting the X-rays which passed through the sample with the line sensor at the plurality of pixels; a step of image storage, storing intensity of X-rays detected at each of the plurality of pixels; a step of intensity correction, correcting the stored intensity of X-rays; and a step of defect detection, detecting whether there is a defect in the sample based on the intensity of X-rays. The step of intensity correction, using the intensity of X-rays detected in an initial inspection initiation region of the sample when detection of X-rays was initiated or the intensity of X-rays detected from the sample prior to initiation of detection of the X-rays as reference radiation intensity, based on a correction coefficient obtained from comparison of the reference radiation intensity with the intensity of X-rays detected after the inspection initiation region, corrects the intensity of X-rays of the pixels detected in regions after the inspection initiation region.

An X-ray inspection method as a seventh invention features that in the sixth invention, based on the correction coefficient obtained from comparison between the intensity of X-rays detected in a defect detection region which is a region of the sample where the defect is detected and the intensity of X-rays detected in a region immediately before the defect detection region, in the step of intensity correction, when the defect is detected in the step of defect detection, correction of the intensity of X-rays detected in the defect detection region is performed.

An X-ray inspection method as an eighth invention features that in the sixth or seventh invention, in the step of defect detection, determining whether there is a defect based on a change in the correction coefficient.

An X-ray inspection method as a ninth invention features that in any one of the sixth to eighth inventions, the X-ray detector comprises a line sensor calculation unit that controls accumulation and transmission of charges in the plurality of pixels according to the certain direction, wherein the line sensor calculation unit divides the plurality of pixels into a plurality of blocks and performs the transmission for each block, and in the step of intensity correction, based on an average of the intensity of X-rays calculated for each block, correction of each of the plurality of pixels in the corresponding block is performed.

An X-ray inspection method as a tenth invention features that in any one of the sixth to ninth inventions, the X-ray detector may be provided with a TDI sensor having the line sensors in a plurality of columns along the certain direction with the plurality of pixels arranged in matrix and detecting the X-rays which passed through the sample at the pixels.

The inventions have the advantages described below.

That is, with the use of the X-ray inspection apparatus or the X-ray inspection method of the invention, the intensity of X-rays detected from the inspection initiation region of the sample after starting inspection of the sample or the intensity of X-rays preliminarily detected from the sample before starting the inspection of the sample is set as the reference radiation intensity, and the intensity of X-rays detected from an inspection region subsequent to the inspection initiation region of the sample is corrected based on a correction coefficient obtained by comparing the intensity of X-rays detected from the inspection region subsequent to the inspection initiation region and the reference radiation intensity. Therefore, even a long sheet-like sample can be continuously inspected while performing intensity correction.

Therefore, with the use of the X-ray inspection apparatus or the X-ray inspection method of the invention, it is possible to continuously and effectively inspect a long sample such as a separator of a lithium ion cell, a separator of a fuel cell, a gas diffusion layer, a carbon paper sheet, or the like while maintaining high detection accuracy.

DETAILED DESCRIPTION OF THE INVENTION

Hereinafter, an X-ray inspection apparatus of an embodiment of the invention and an X-ray inspection method of an embodiment of the invention will be described with reference to FIGS. 1 to 8.

Figure 1:
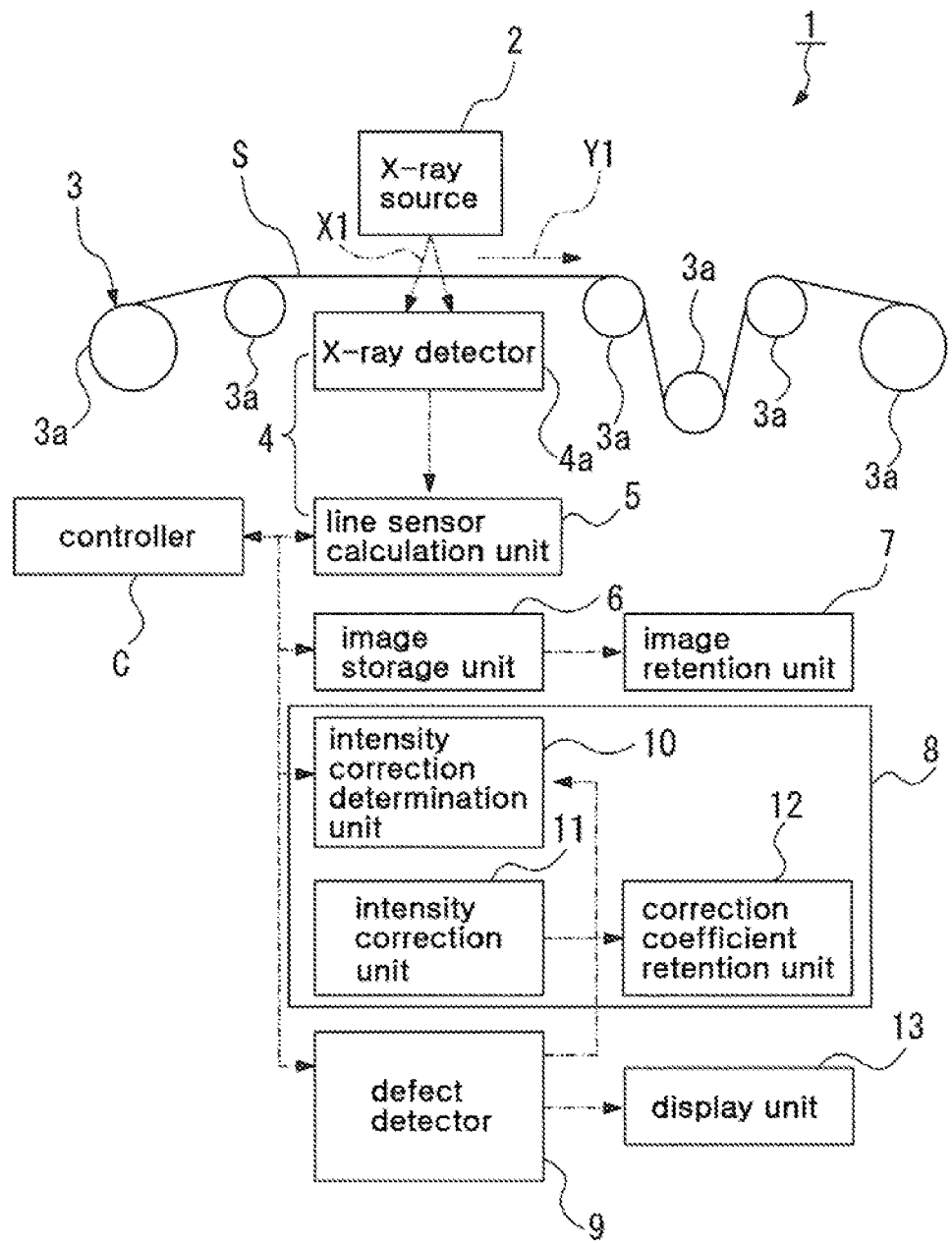
FIG. 1 is a schematic diagram illustrating the overall construction of an X-ray inspection apparatus, among an X-ray inspection apparatus and an X-ray inspection method that embody the present invention.
Figure 2:
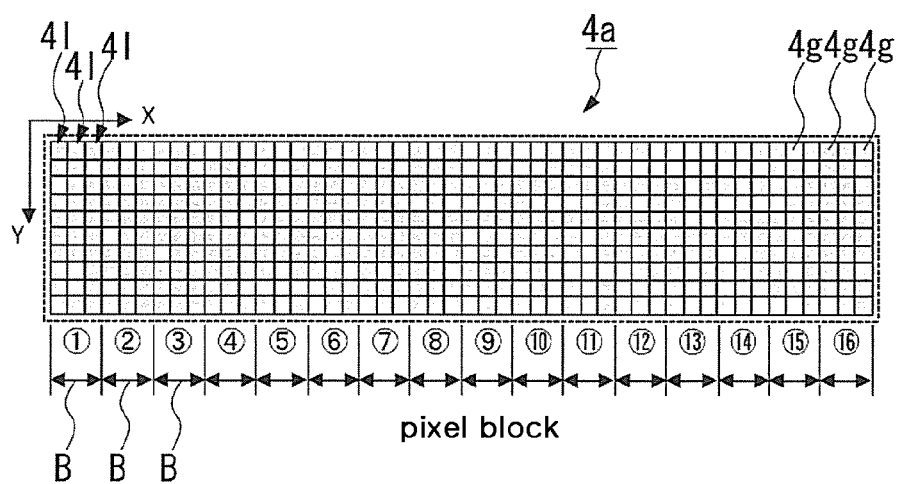
FIG. 2 is a plan view illustrating the pixels of a TDI sensor and images (frames) used in the present embodiment of the invention.

As illustrated in FIGS. 1 and 2, an X-ray inspection apparatus 1 of one embodiment of the invention includes: an X-ray source 2 that irradiates a sample S with X-rays X1; a sample moving mechanism 3 that moves the sample S in a certain direction Y1 while the X-ray source 2 irradiates the sample S with the X-rays X1; an X-ray detector 4 installed to face the X-ray source 2 with the sample S disposed therebetween and equipped with a line sensor 41 including a plurality of pixels 4g arranged in a direction orthogonal to the certain direction Y1, the pixels 4g detecting the X-rays X1 passing through the sample S; an image storage unit 6 that stores the intensity of the X-rays rX1 detected by each of the pixels 4g as an intensity of X-rays; an intensity correction unit 8 that corrects the X-ray radiation intensities stored in the image storage unit 6; and a defect detector 9 that determines whether there is a defect X in the sample S based on the X-ray radiation intensities.

Examples of the defect X include a foreign object, a wrinkle, a hole, etc.

The intensity correction unit 8 sets intensity of X-rays that is detected from the inspection initiation region of the sample S, which is a region first inspected after starting inspection of the sample S, or an intensity of X-rays that is detected from the sample S before starting the inspection of the sample S, as a reference radiation intensity. The intensity correction unit 8 obtains a correction coefficient by comparing the reference radiation intensity with an intensity of X-rays that is detected from an inspection region subsequent to the inspection initiation region and corrects the intensity of X-rays detected by each of the pixels 4g from the inspection regions subsequent to the inspection initiation region based on the correction coefficient.

In the case where the intensity correction unit 8 detects a defect X from the sample S, the intensity correction unit 8 obtains a correction coefficient by comparing an intensity of X-rays detected from a defect detection region in which the defect X is present and an intensity of X-rays detected from a defect-free inspection region that is the region inspected immediately prior to the defect detection region, and performs the correction of the intensity of X-rays detected from the defect detection region based on the correction coefficient. That is, in the case where any defect is detected, the intensity of X-rays detected from the defect-free inspection region immediately prior to the defect detection region is used as a reference radiation intensity to calculate the correction coefficient.

The defect detector 9 detects the defect X according to a change in the correction coefficient.

In the X-ray detector 4, multiple line sensors 41 are arranged in the certain direction Y. Thus, the X-ray detector 4 has plurality of pixels 4g arranged overall in matrix. The X-ray detector 4 includes a TDI sensor 4a that detects X-ray radiation passing through the sample S and a line sensor calculation unit 5 that controls accumulation and transmission of charges of the plurality of pixels 4g in the certain direction Y1.

The X-ray inspection apparatus 1 of the present embodiment includes a controller C that controls each component thereof and a display unit 13 that displays information such as a transmission image.

The line sensor calculation unit 5 has a data transmission function of transmitting data of cumulative charges which is the result of conducting the accumulation and transmission of charges, to the image storage unit 6.

The line sensor calculation unit 5 is configured to group the pixels 4g into multiple blocks B and to transmit the charges for each block B. That is, the data transmission is performed block by block.

The intensity correction unit 8 performs the correction of intensity of X-rays for the pixels 4g in each block B based on the average of X-ray radiation intensities of the pixels 4g in the corresponding block B.

As illustrated in FIG. 2, each block is a so-called tab composed of multiple line sensors 41 the pixels values of which are read out (transmitted) at a time in the line sensor calculation unit 5. Each block B is composed of, for example, 384 pixels×1000 lines. The TDI sensor 4a used in the present embodiment includes 16 blocks arranged in the certain direction Y1.

The controller C is a control computer composed of a central processing unit (CPU) and the like. The controller C includes an operation processing circuit that creates a transmission image by performing image processing on a signal (i.e., the data) that is inputted to the image storage unit 6 from the line sensor calculation unit 5 and the intensity correction unit 8, and causes the display unit 13 to display the transmission image.

The display unit 13 is a display device that is connected to the controller C and which displays a contrast image or the like. The display unit 13 can display various information according to a control signal transmitted from the controller C. The display unit 13 can display a defect X such as a foreign object detected by the defect detector 9.

The X-ray source 2 is an X-ray tube that can radiate X-rays X1. Thermal electrons generated from the filament (cathode) in the tube are accelerated by a voltage applied across the filament (cathode) and a target (anode), the accelerated thermal electrons collide with the target made of tungsten W, molybdenum Mo, or chrome Cr to generate X-rays X1, and the X-rays X1 is radiated as primary X-ray through a window made of beryllium foil.

For example, the sample S may be a band-shaped material for a lithium ion cell or a fuel cell, or a long sheet-like material used in the pharmaceutical industry, a gas diffusion layer or a carbon paper sheet. For example, when the sample S is an electrode sheet used in a secondary lithium ion battery, a defect X introduced into the electrode sheet may be assumed to be Fe or SUS which is an impurity of concern in the electrode.

The sample moving mechanism 3 includes a motor (not illustrated) for moving the sample S in relative to the TDI sensor 4 in a longitudinal direction in which the sample S extends and multiple pairs of rollers 3a that roll in and out the band-shaped sample S in the longitudinal direction in a roll-to-roll manner.

The time delay integration (TDI) sensor 4a is implemented with a charged-couple device (CCD) sensor, a complementary metal oxide semiconductor (CMOS) sensor, a CdTe semiconductor sensor, or a Si semiconductor sensor. For example, the TDI sensor 4a is an X-ray detector in which plurality of pixels (also called cells or sensor elements) 4g are arranged in a direction parallel to a direction orthogonal to the moving direction (the certain direction Y1) in which the sample S moves. The detector includes a phosphor provided on a detection surface, a fiber optics plate (FOP) disposed under the detection surface and composed of multiple fibers two-dimensionally arranged in rows and columns, and a Si light-receiving element disposed under the FOP. The detector has a configuration in which multiple line sensors 41 are arranged in multiple lines. For example, the TDI sensor 4a has a configuration in which 200 to 1000 line sensors 41 are arranged in the moving direction in which the sample S moves.

In the TDI sensor 4a, a phosphor such as cesium iodide (CsI), gadolinium oxysulfide (GOS), or yttrium aluminum garnet (YAG) is used.

In the case of the TDI sensor 4a, the pixels 4g arranged in the certain direction Y1 are grouped into blocks B and accumulation and transmission of charges are performed block by block.

The intensity correction unit 8 includes an intensity correction determination unit 10 that determines whether to perform intensity correction or not, an intensity correction processing unit 11 that perform intensity correction operation processing, and a correction coefficient retention unit 12 that maintains a correction coefficient used for intensity correction.

The intensity correction determination unit 10 determines whether to perform intensity correction in sequential mode or regular time interval mode according to settings. When the defect detector 9 detects a defect X in the sample, the intensity correction determination unit 10 has a function of determining whether to use the intensity of X-rays detected from a defect-free inspection region immediately prior to the defect detection region as the intensity of X-rays of a pre-corrected image in order to calculate a correction coefficient.

Next, an X-ray inspection method using the X-ray inspection apparatus in the present embodiment will be described.

The X-ray inspection method in the present embodiment includes: an X-ray radiation step in which an X-ray source 2 irradiates a sample S with X-ray X; a sample moving step of continuously moving the sample S in a certain direction Y1 while the X-ray source 2 irradiates the sample S with the X-ray rX1; an X-ray radiation detection step of detecting X-ray passing through the sample S with an X-ray detector 4 disposed to face the X-ray source 2 with the sample S disposed therebetween and provided with one or more line sensors 41 each including plurality of pixels 4g arranged in a direction orthogonal to the certain direction Y1; an image saving step of saving X-ray radiation intensities detected by the pixels 4g; an intensity correction step of correcting the saved X-ray radiation intensities; and a defect detection step of determining whether there is a defect X in the sample S based on the corrected X-ray radiation intensities.

In the intensity correction step, an intensity of X-rays detected from the inspection initiation region which is inspected first after starting inspection of the sample S or an intensity of X-rays detected from the sample X before starting the inspection of the sample S is used as a reference radiation intensity. A correction coefficient is obtained from comparison between an intensity of X-rays detected from an inspection region subsequent to the inspection initiation region of the sample S and the reference radiation intensity. The X-ray radiation intensities detected by the pixels 4g from the inspection region subsequent to the inspection initiation region of the sample S are corrected based on the correction coefficient.

In addition, in the defect detection step, in a case where a defect X is detected, the correction coefficient may be obtained from comparison between an intensity of X-rays detected from a defect detection region which is the current inspection region and within which the defect X is present and an intensity of X-rays detected from a defect-free inspection region which is inspected immediately prior to the current inspection region. In this case, in the intensity correction step, the intensity correction of the intensity of X-rays of the defect detection region is performed based on this correction coefficient. That is, when a defect is detected, the correction coefficient for the defect detection region is calculated by using the intensity of X-rays of the immediately preceding defect-free inspection region as the reference radiation intensity.

In addition, in the defect detection step, whether there is a defect X or not is determined based on a threshold value of the intensity of X-rays or based on a change in the correction coefficient.

In addition, in the intensity correction step, an averaged intensity of X-rays for each block B is calculated. The X-ray radiation intensities of the pixels 4g in the corresponding block B are corrected based on the averaged intensity of X-rays of the corresponding block B.

In the X-ray inspection method of the present embodiment, the sample S is moved at a predetermined fixed speed in the certain direction Y1 to pass through a region between the X-ray source 2 and the TDI sensor 4a by the sample moving mechanism 3.

Next, the X-ray source 2 is activated to irradiate the sample S with X-rays X1 and the TDI sensor 4a is activated to detect transmission X-ray passing through the sample S and the defect X.

Figure 3A:
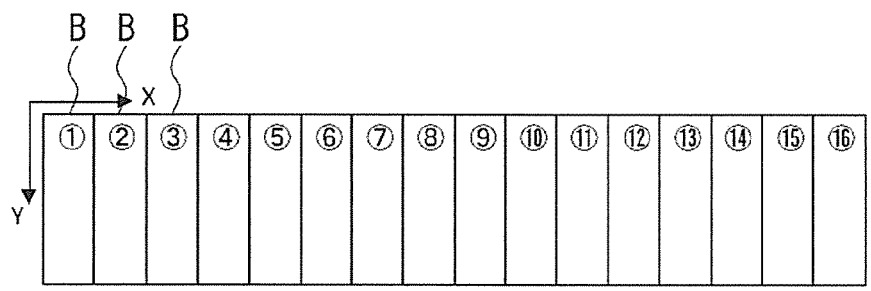
FIGS. 3A, 3B, and 3C illustrate a reference image, a pre-corrected image that is used for calculation of a correction coefficient, and a corrected image, respectively, used in the present embodiment of the invention.

In this step, the sample S is moved by the sample moving mechanism 3 in the certain direction Y1. Referring to FIG. 2, the initial X-ray radiation intensities of all of the blocks B1 to B16 of the TDI sensor 4a detected at the beginning of inspection from the image (frame) output from the TDI sensor 4a, are transmitted to the line sensor calculation unit 5 are used as the reference radiation intensities of the inspection initiation region and are stored in the image storage unit 6 and the image retention unit 7 as illustrated in FIG. 3A.

Alternatively, instead of the X-ray radiation intensities detected from the inspection initiation region of the sample S, X-ray radiation intensities detected from a region of the sample S before the inspection is started may be used as reference radiation intensities and may be stored in the image storage unit 6 and the image retention unit 7.

In the inspection initiation region, a change or variation in the intensity of X-rays of the TDI sensor 4a does not occur. Thus, as illustrated in FIG. 3A, all of the images representing the X-ray radiation intensities of the respective blocks B are the same.

After the inspection is performed on the inspection initiation region, the subsequent inspection regions of the sample S are sequentially inspected while the sample S is moved. That is, the X-ray radiation intensities of the respective blocks of the TDI sensor 4a are detected from each inspection region. When the inspection for the sample S is performed, calculation of correction coefficients for the X-ray radiation intensities of the respective blocks is sequentially or periodically performed and correction of the X-ray radiation intensities is performed based on the respective correction coefficients.

Figure 3B:
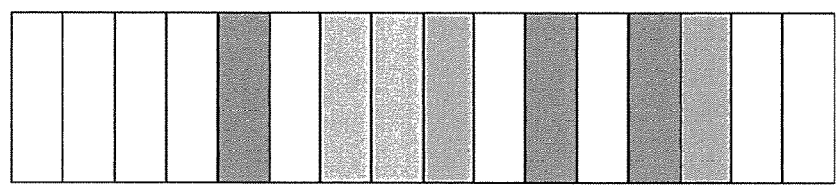
Figure 3C:
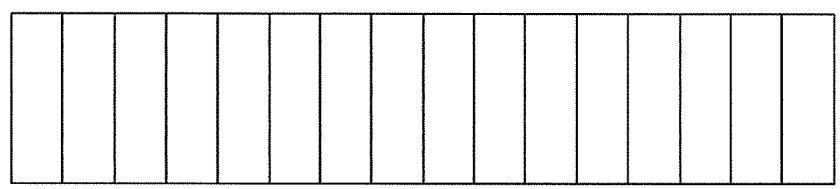

For example, after a certain period of time passes, as illustrated in FIG. 3B, the X-ray radiation intensities (in a pre-corrected image) detected by some blocks of the TDI sensor 4a differ from the reference radiation intensities (in a reference image) of the respective corresponding blocks of the TDI sensor 4a. In this case, for each of the blocks in which a change occurs in the intensity of X-rays, a correction coefficient is calculated from comparison between the intensity of X-rays measured from the pre-corrected image and the reference radiation intensity measured from the reference image taken from the inspection initiation region or the reference image that is taken before the beginning of the inspection.

In addition, in FIG. 3B, the intensity of X-rays of each block is represented by the brightness in gray scale. A relatively bright block in gray scale represents a block with a relatively high intensity of X-rays.

The correction coefficient is calculated for each block according to Equation 1.

In addition, the correction coefficient for each block B is calculated based on the average of the X-ray radiation intensities of the respective pixels of the corresponding block. That is, the intensity correction unit 8 primarily calculates the average of the X-ray radiation intensities of the respective pixels 4g in each block B, and the averages of the respective blocks are used in Equation 1 and Equation 2. In addition, the intensity of X-rays of each pixel 4g is preliminarily corrected in terms of shading by the line sensor calculation unit 5 or the intensity correction unit 8. That is, the reference radiation intensity refers to the averaged intensity of X-rays of the image shading of which is corrected.

Next, the obtained correction coefficient for each block B is used to calculate the intensity of X-rays of the corresponding block of the corrected image according to Equation 2.

Correction coefficient=averaged reference radiation intensity of reference image÷averaged intensity of X-rays of pre-corrected image     Equation 1 intensity of X-rays of each pixel of corrected image=intensity of X-rays of each pixel of pre-corrected image×correction coefficient     Equation 2

Figure 4A:
FIGS. 4A, 4B, 4C, and 4D illustrate a reference image taken at a time of 0 minute, a pre-corrected image taken at a time of 60 minutes, a pre-corrected image taken at a time of 120 minutes, and a luminance profile graph thereof, respectively, used in the embodiment of the invention.
Figure 4B:
Figure 4C:
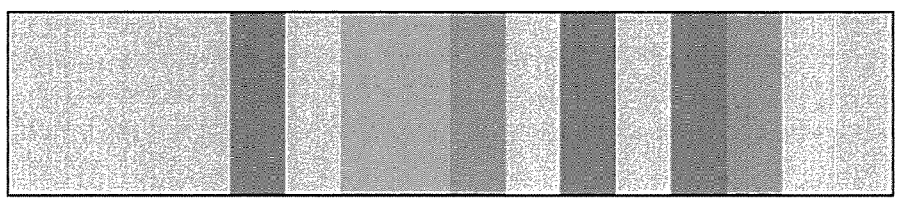
Figure 4D:
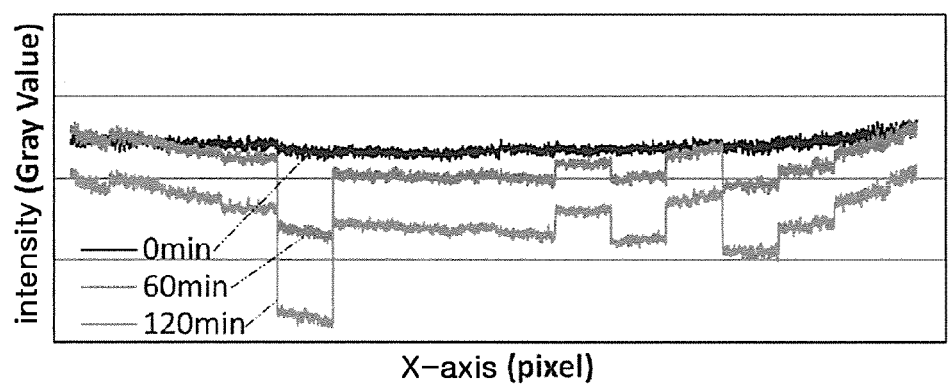
Figure 6A:
FIGS. 6A, 6B, 6C, and 6D illustrate a reference image taken at a time of 0 minute, a pre-corrected defect-containing image taken at a time of 120 minutes, a luminance profile graph thereof, and a defect-free image taken immediately prior to the defect-containing image, respectively, used in the present embodiment of the invention.
Figure 6B:
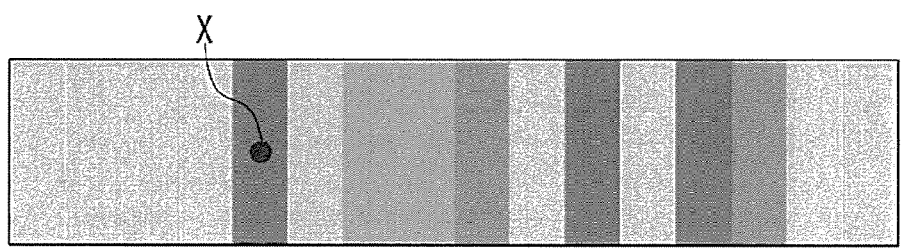

For example, in the case where the intensity correction determination unit 10 is configured to perform intensity correction at a time interval of 60 minutes, the intensity of X-rays of each block of a reference image illustrated in FIG. 6A and obtained at a time of 0 minute is recorded as the reference radiation intensity of the corresponding block. When pre-corrected images illustrated in FIGS. 4B and 4C are obtained at a time of 60 minutes and a time of 120 minutes, respectively after the inspection for the sample is started, luminance profiles of the X-ray radiation intensities of the respective pre-corrected images 4B and 4C are obtained as illustrated in FIG. 4D.

As can be seen from the luminance profiles, when a time of 60 minutes or a time of 120 minutes passes after the inspection is initiated, the intensity of X-rays for each block B changes from the intensity of X-rays (i.e., reference radiation intensity) of the corresponding block, measured from the reference image of an inspection start region (i.e., inspection initiation region) taken at a time of 0 minute, and thus the luminance for each block is more severely deteriorated as time passes.

Figure 5A:
FIGS. 5A, 5B, and 5C illustrate a corrected image taken at a time of 60 minutes, a corrected image taken at a time of 120 minutes, and a luminance profile graph thereof, respectively, used in the present embodiment.
Figure 5B:
Figure 5C:
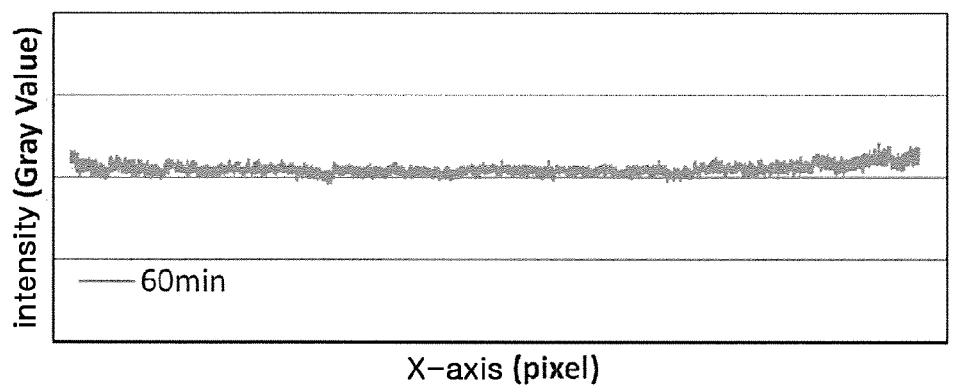

For this reason, in the present embodiment, the intensity correction processing unit 11 performs operation processing according to Equation 1 and Equation 2, thereby correcting the X-radiation intensity of the pre-corrected image taken at a time of 60 minutes and the X-ray intensity of the pre-corrected image taken at a time of 120 minutes. Thus, the x-ray radiation intensities of the corrected images shown in FIGS. 5A and 5B are obtained. As a result, as illustrated in FIG. 5C, the luminance profile of the intensity of X-rays of an image corrected from the pre-corrected image taken at a time of 60 minutes shows that a variation in the intensity of X-rays among the blocks is inhibited like the luminance profile of the reference radiation intensity.

Next, for a case where the defect detector 9 detects a defect X from the pre-corrected image taken at a time of 120 minutes as illustrated 6B after starting the inspection, a method of correcting the intensity of X-rays of the pre-corrected image based on the reference radiation intensity of the inspection initiation region shown in FIG. 6A will be described.

The image storage unit 6 and the image retention unit 7 sequentially store and retain images taken at predetermined time intervals. The image storage unit 6 and the image retention unit 7 may be a memory means, such as a ROM, a RAM, a hard disc, and the like.

The intensity correction processing unit 11 sequentially calculates a correction coefficient for each block according to Equation 1 and Equation 2, and records and stores the values of the correction coefficients in a coefficient retention unit 12. The defect detector 9 determines that there is the defect X in a block for which the correction coefficient abruptly changes by a significant amount exceeding a predetermined amount. That is, a gradual change with time in the intensity of X-rays of each pixel 4g is regarded as a temperature-induced change but such an abrupt significant change is regarded as a defect-induced change.

Figure 6C:
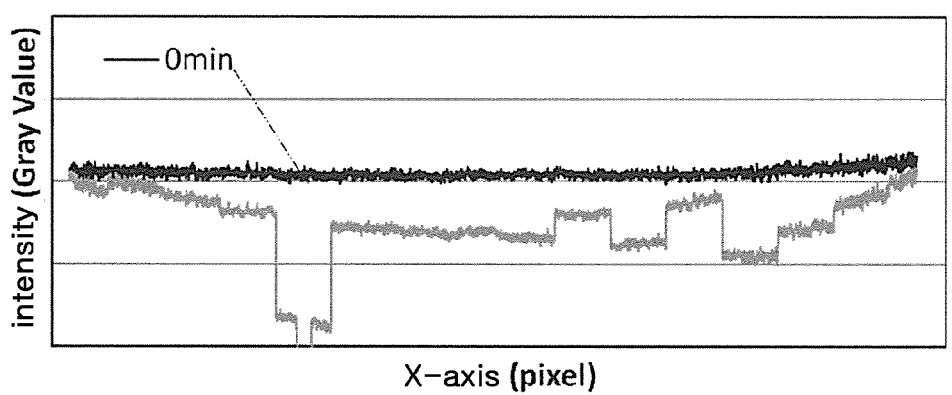
Figure 6D:
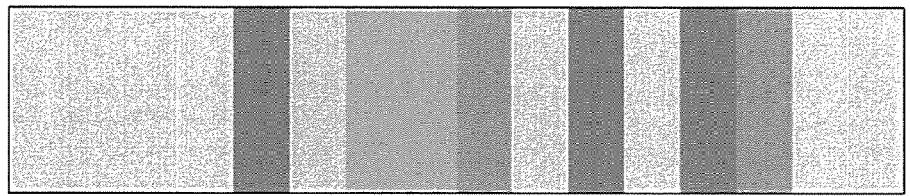
Figure 7A:
FIGS. 7A and 7B illustrate a corrected image obtained by correcting an image taken at a time of 120 minutes based on a correction coefficient calculated using the intensity of a defect detection region (image taken at a time of 120 minutes) and a luminance profile thereof, respectively, used in the present embodiment of the invention.
Figure 7B:
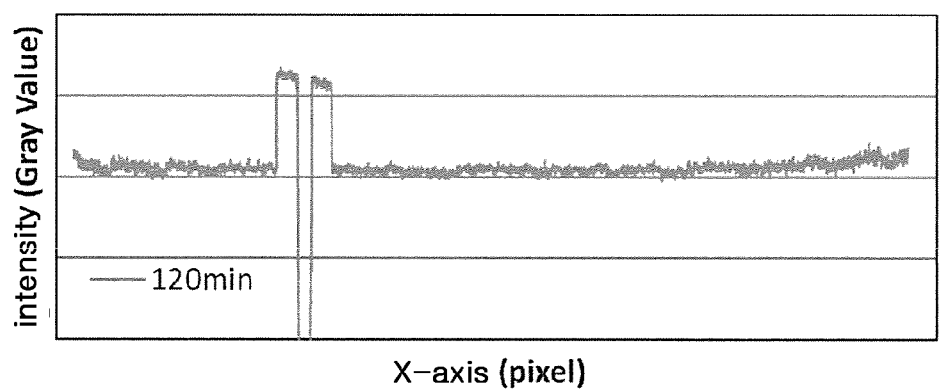

When the defect detector 9 determines that there is a defect X in a pre-corrected image, as illustrated in FIG. 6C, the luminance profile of the X-ray radiation intensities of the respective blocks measured from the pre-corrected image (corresponding to a defect detection region) shows that the intensity of X-rays abruptly significantly changes in a block where the defect X is present with respect to the reference radiation intensity measured from the reference image taken from the inspection initiation region. That is, the luminance is greatly deteriorated in the block B. Therefore, if the correction coefficient is calculated in the same manner as described above based on the reference radiation intensity of FIG. 6A and the intensity of X-rays of the defect detection region of FIG. 6B where the defect X is present, as illustrated in FIG. 7A, since the correction effect is excessively strong in the block B where the defect X is present, the corrected image has an abnormal luminance profile in the block where the defect X is present, as illustrated in FIG. 7B.

In particular, when the defect X is attributable to a large foreign object, the over correction effect more clearly stands out.

Therefore, in the present embodiment, based on the signal transmitted from the defect detector 9 that has detected the defect X, the intensity correction determination unit 10 transmits the X-ray radiation intensities of an inspection region (refer to FIG. 6D) that is immediately prior to the defect detection region where the defect X is present, that is, the imaged of the inspection region taken immediately before a time of 120 minutes, to the intensity correction unit 11 as a pre-corrected image to be corrected. Thus, the intensity correction unit 11 calculates a correction coefficient from comparison between the intensity of X-rays of the inspection region immediately prior to the defect detection region and the reference radiation intensity, and performs intensity correction based on the correction coefficient.

Figure 8A:
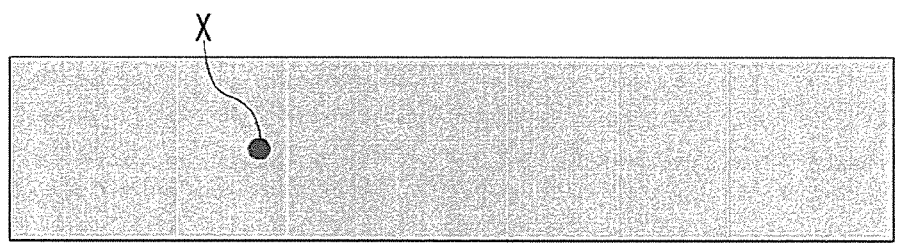
FIGS. 8A and 8B illustrate a corrected image obtained by correcting an image taken at a time of 120 minutes based on a correction coefficient calculated using the intensity of a defect-free inspection region immediately prior to the defect detection region and a luminance profile thereof, respectively, used in the present embodiment of the invention.
Figure 8B:
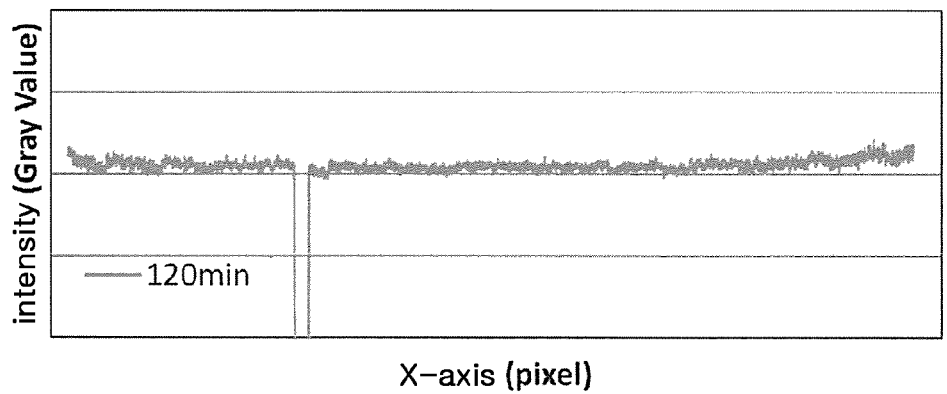

In this manner, when a defect X is present in the sample S, the intensity correction is performed by using the intensity of X-rays of a defect-free inspection region that is immediately prior to the defect detection region, and thus, as illustrated in FIG. 8A, even the intensity of X-rays of the block B having the defect X can be properly corrected like the other blocks B with no defect. Therefore, as illustrated in FIG. 8B, a luminance profile in which the luminance of the block with the defect X is locally lowered is obtained.

As described above, in the X-ray inspection apparatus 1 of the present embodiment, the intensity correction unit 8 uses the intensity of X-rays of the inspection initiation region of the sample S among the regions to be inspected after initiating the inspection of the sample S, or the intensity of X-rays that is preliminarily detected from the sample S before initiating the inspection as the reference radiation intensity, obtains a correction coefficient from comparison between the reference radiation intensity and the intensity of X-rays of an inspection region subsequent to the inspection initiation region, and corrects the X-ray radiation intensities of the pixels 4g for the inspection region subsequent to the inspection initiation region based on the obtained correction coefficient. Therefore, even a long sheet-like sample can be continuously inspected while performing intensity correction.

That is, the intensity of X-rays detected from the inspection initiation region on which the temperature change of the X-ray detector 4 does not have an influence, or the intensity of X-rays that is preliminarily detected from the sample before starting the inspection of the sample is used as the reference radiation intensity, and the intensity of X-rays that is subsequently detected is corrected based on the reference radiation intensity. Therefore, it is not necessary to have a period of time during which no sample is present or a boundary of a packaged sample at the time of performing a correction operation, and even a long sample S can be can be continuously inspected in real time even when an inspection time required for the sample S is long.

In addition, in a case where the defect detector 9 detects a defect X within an inspection region, the intensity correction unit 8 corrects the intensity of X-rays of the defect-containing inspection based on a correction coefficient obtained from comparison between the intensity of X-rays detected from the defect detection region and the intensity of X-rays of a defect-free inspection region that is immediately prior to the defect detection region. Therefore, it is possible to perform the intensity correction using a proper correction coefficient reflecting the intensity of X-rays attributable to the defect X such as a foreign object.

When a correction coefficient is calculated using the intensity of X-rays of an inspection region within which the defect X is present, the resulting correction coefficient is not proper because an excessively large difference occurs between the reference radiation intensity and the intensity of X-rays of the defect detection region due to the presence of the defect X. Therefore, in this case, the correction coefficient is calculated using the intensity of X-rays of the defect-free inspection region immediately prior to the defect detection region. Therefore, it is possible to properly correct the intensity of X-rays of such a defect detection region.

In addition, since the defect detector 9 determines whether a defect X is present or not according to a change in the correction coefficient and such a defect X causes a significantly large change in the correction coefficient, it is possible to easily detect the defect X such as a foreign object.

In addition, since the intensity correction unit 8 corrects the intensity of X-rays for each block based on the average of the X-ray radiation intensities of the pixels 4g in the corresponding block B, it is possible to reduce arithmetic processing compared to the case of performing intensity correction pixel by pixel.

Further, the described apparatus (for example, the intensity correction unit 8, the defect detector 9, etc.) may be configured such that a program for realizing a function of an optional component is stored in a computer-readable recording medium, and a computer system reads the program to execute the program. Further, "the computer system" used herein includes hardware such as an operating system (OS) or a peripheral device. "The computer-readable storage medium" is a portable medium such as a flexible disk, a magneto-optical disk, a ROM, and a compact disk (CD)-ROM, and a storage medium such as a hard disk provided in the computer system. "The computer-readable storage medium" includes a medium that is provided with a communication line such as a telephone line and a network such as the internet to maintain the program for a certain time like volatile memory (RAM) in the computer system that is server or client when the program is sent.

The program may be connected with a transmission medium from the computer system that stores the program in the storage medium, or may be transmitted to another computer system by a transmission wave in the transmission medium. "The transmission medium" transmitting the program is a medium having a function of transmitting information like the network (communication network) such as the internet or the communication line such as the telephone line.

The program may be provided to realize some of the functions described above. The program may be a difference file (difference program) capable of realizing the above-described functions in combination with a program stored in advance in the computer system. The technical scope of the present invention is not limited to the above embodiments, and various changes can be made without departing from the spirit of the present invention.

What is claimed is:

1. An X-ray inspection apparatus comprising:
   an X-ray source configured to irradiate a sample with X-rays;
   a sample moving mechanism configured to move the sample in a certain direction during irradiation with X-rays from the X-ray source;
   an X-ray detector installed to face the X-ray source with the sample disposed therebetween, the X-ray detector comprising a line sensor which is provided with plurality of pixels that are arranged along a direction orthogonal to the certain direction and is configured to detect the X-rays which passed through the sample at the pixels;
   an image storage unit configured to store intensity of X-rays detected by each of the plurality of pixels;
   an intensity correction unit configured to correct the intensity of X-rays stored in the image storage unit; and
   a defect detector configured to detect whether there is a defect or not in the sample based on the intensity of X-rays,
   wherein the intensity correction unit, using the intensity of X-rays detected in an initial inspection initiation region of the sample when detection of X-rays was initiated or the intensity of X-rays detected from the sample prior to initiation of detection of the X-rays as reference radiation intensity, based on a correction coefficient obtained from comparison of the reference radiation intensity with the intensity of X-rays detected after the inspection initiation region, corrects the intensity of X-rays of the pixels detected in regions after the inspection initiation region.

2. The apparatus according to claim 1, wherein, based on the correction coefficient obtained from comparison between the intensity of X-rays detected in a defect detection region which is a region of the sample where the defect is detected and the intensity of X-rays detected in a region immediately before the defect detection region, when the defect detector detects the defect, the intensity correction unit corrects the intensity of X-rays detected in the defect detection region.

3. The apparatus according to claim 1, wherein the defect detector determines whether there is a defect or not based on a change in the correction coefficient.

4. The apparatus according to claim 1, wherein the X-ray detector comprises a line sensor calculation unit that controls accumulation and transmission of charges in the plurality of pixels according to the certain direction,
   wherein the line sensor calculation unit divides the plurality of pixels into a plurality of blocks and performs the transmission for each block, and
   wherein the intensity correction unit performs, based on an average of the intensity of X-rays calculated for each block, correction of each of the plurality of pixels in the corresponding block is performed.

5. The apparatus according to claim 1, wherein the X-ray detector is provided with a TDI sensor having the line sensors in a plurality of columns along the certain direction with the plurality of pixels arranged in matrix and detecting the X-rays which passed through the sample at the pixels.

6. An X-ray inspection method comprising:
   a step of X-ray irradiation, irradiating a sample with X-rays from an X-ray source;
   a step of sample movement, continuously moving the sample in a certain direction during irradiation with X-rays from the X-ray source;
   a step of X-ray detection, with an X-ray detector installed to face the X-ray source with the sample disposed therebetween, the X-ray detector comprising a line sensor which is provided with a plurality of pixels that are arranged along a direction orthogonal to the certain direction, detecting the X-rays which passed through the sample with the line sensor at the plurality of pixels;
   a step of image storage, storing intensity of X-rays detected at each of the plurality of pixels;
   a step of intensity correction, correcting the stored intensity of X-rays; and a step of defect detection, detecting whether there is a defect in the sample based on the intensity of X-rays, wherein the step of intensity correction, using the intensity of X-rays detected in an initial inspection initiation region of the sample when detection of X-rays was initiated or the intensity of X-rays detected from the sample prior to initiation of detection of the X-rays as reference radiation intensity, based on a correction coefficient obtained from comparison of the reference radiation intensity with the intensity of X-rays detected after the inspection initiation region, corrects the intensity of X-rays of the pixels detected in regions after the inspection initiation region.

7. The method according to claim 6, wherein, based on the correction coefficient obtained from comparison between the intensity of X-rays detected in a defect detection region which is a region of the sample where the defect is detected and the intensity of X-rays detected in a region immediately before the defect detection region, in the step of intensity correction, when the defect is detected in the step of defect detection, correction of the intensity of X-rays detected in the defect detection region is performed.

8. The method according to claim 6, wherein, in the step of defect detection, determining whether there is a defect based on a change in the correction coefficient.

9. The method according to claim 6, wherein
the X-ray detector comprises a line sensor calculation unit that controls accumulation and transmission of charges in the plurality of pixels according to the certain direction,
wherein the line sensor calculation unit divides the plurality of pixels into a plurality of blocks and performs the transmission for each block, and
in the step of intensity correction, based on an average of the intensity of X-rays calculated for each block, correction of each of the plurality of pixels in the corresponding block is performed.

10. The method according to claim 6, wherein the X-ray detector is provided with a TDI sensor having the line sensors in a plurality of columns along the certain direction with the plurality of pixels arranged in matrix and detecting the X-rays which passed through the sample at the pixels.

\* \* \* \* \*